United States Patent Office 3,316,142
Patented Apr. 25, 1967

3,316,142
METHOD AND APPARATUS FOR REMOVING WATER FROM A PULP SUSPENSION AND PARTICULARLY IN FORMING A PAPER WEB
Axel Ole William Gahmberg, Helsinki, Finland
(Niittykumpu 11F, Niittykumpu, Finland)
Filed Nov. 26, 1963, Ser. No. 330,513
Claims priority, application Finland, Nov. 26, 1962, 2,118/62
14 Claims. (Cl. 162—202)

In modern paper machines the wet end limits the speed of the machine. With increased speed the length of the wire-cloth has to be increased for allowing enough water to be removed through the wire-cloth from the fiber suspension arriving on the wire-cloth. A long wire-cloth involves, however, great difficulties. Its guidance grows troublesome, so that it strives to move to one side when the paper machine is running. Moreover, the cost of a wire-cloth of course increases with increasing length. Because the wire-cloth wears away where it rubs against the suction boxes, it has to be replaced. Thus the costs of wire cloth are very large with increasing length of the cloth.

In the present invention the wet end of the paper machine is formed on a wholly different principle as hitherto used in paper machines. The invention principally relates to a method for removing water from a fibrous pulp suspension, whereby the suspension is conveyed to the inner surface of a cylindrical wire cloth assembly, which is composed of a number of sections in the longitudinal direction of the cylinder, in which sections the wire-cloths are arranged to move with equal speed so that the cylindrical inside surface confined by them advances continually with a uniform speed towards the other end of the wire-cloth assembly.

A method of this kind is known for manufacturing tubes from a fiber suspension. According to such method a spindle is placed inside a cylindrical wire-cloth device. The fiber suspension is poured into the annular space between the wire-cloth and the spindle, which space is reduced towards the end. Thus the suspension is subjected to a continually increasing pressure, whereby so much water is removed from it that the result will be a coherent pulp tube.

This method, however, is not suitable in connection with paper manufacturing due to the slowness of the method and to the pressure developed by it.

The present invention, on the contrary, is characterized in that pulp suspension is laterally discharged against the inside surface of the cylindrical wire cloth.

The discharge of the pulp suspension towards the surface of the wire-cloth is particularly essential and important. By this it is achieved that an ample amount of water is at once removed from the pulp through the wire-cloth. Water is of course also removed in the usual way by applying suction to the opposite side of the wire-cloth.

According to an advantageous embodiment of the invention the pulp suspension is conveyed into the cylinder through a coaxial pipe, the outlet end of which is provided with a disc-shaped space with on open periphery. By the disc-shaped space the pulp suspension is directed in proper manner against the surface of the wire-cloth.

It is appropriate, that the pulp suspension is discharged into the inside surface of the cylindrical wire-cloth by the centrifugal force developed by rotating the pulp pipe. In this manner it is easy to generate the force needed for a uniform application of the pulp onto the surface of the wire-cloth.

It is also possible to fling the pulp suspension onto the inside surface of the cylindrical wire-cloth assembly by pressure effected with a pressure pump in the pulp pipe. It is, of course, possible to utilize simultaneously both centrifugal force and pressure.

The invention also offers the possibility to form a pulp band or web of several layers composed of different or equal pulp quality. This is effected in such way that the pulp suspension is discharged onto the inside surface of the cylindrical wire-cloth assembly in two or more layers by two or several pulp pipes arranged one within the other.

When the pulp pipes are rotated in opposite directions a pulp band is formed, where the fibres are crosswise oriented. The strength of a such pulp-band is substantially the same in all directions.

In order to increase the efficiency of drying the pulp band, hot air can be conveyed inside the pulp band coaxially with the pulp pipe or pipes and moist air is removed also by pipes coaxial with the pulp pipe or pipes.

According to the invention the cylindrical pulp band is gradually converted to a flat ribbon-like pulp band by conveying it between curved guiding plates.

The invention also relates to an embodiment of the invention, in the form of a machine comprising a cylindrical wire cloth assembly, which is composed of several longitudinal sections of a cylinder, inside which the wire-cloths are arranged to move at equal speeds so that the cylindrical inside surface confined by them continually and with uniform speed advances towards the other end of the wire-cloth assembly. The machine is characterized in that one or several coaxially mounted pipes extend into the cylinder for laterally discharging pulp suspension in one or several layers onto the cylindrical inside surface of the wire-cloth assembly.

A detailed description of the invention is found in the following specification and in the enclosed drawings, where.

The machine shown in FIGURES 1 to 9 comprises a vertically positioned, cylindrical wire-cloth arrangement, the inner surface of which acts as a wire-cloth. The wire-cloth assembly is composed of eight sections running in a longitudinal direction of the cylinder. Each part comprises an endless wire-cloth 1, which is arranged to move in the direction of the arrows 2 over the return rolls 3 and 4. The top return-rolls 3 are drive-rolls which are fastened in bearings on the brackets 6 suspended from the support plates 5. The drive-rolls 3 are coupled to each other by conical gears 7 so that they all rotate with the same speed. Thus also all wire cloths 1, which form a cylindrical wire-cloth surface, advance with equal speed. The movement is transmitted to the drive rolls 3 by a motor (not shown) through a gear drive 8 which is coupled to one of the drive-rolls 3 (see FIG. 2). From the axles 9 of each drive is suspended a frame 10, to the bottom end of which the return roll 4 supporting the wire-cloth 1, is fastened in bearings. For this purpose a slot 11 is provided in the bottom end of the frame so that the axle 12 of the return-roll can be moved for adjusting the stress of the wire-cloth.

Figure 7:
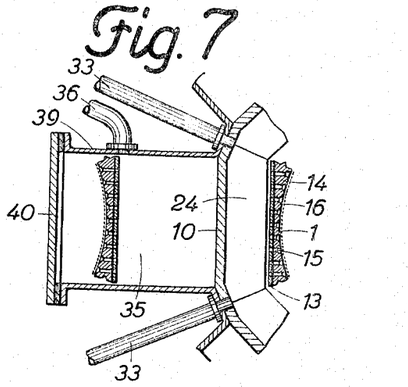
FIG. 7 shows a section taken along line VII—VII in FIG. 1.
Figure 8:
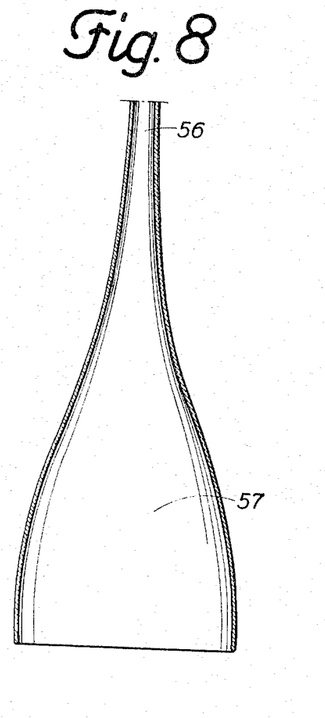
FIG. 8 shows a section taken along line VIII—VIII in FIG. 1.
Figure 9:
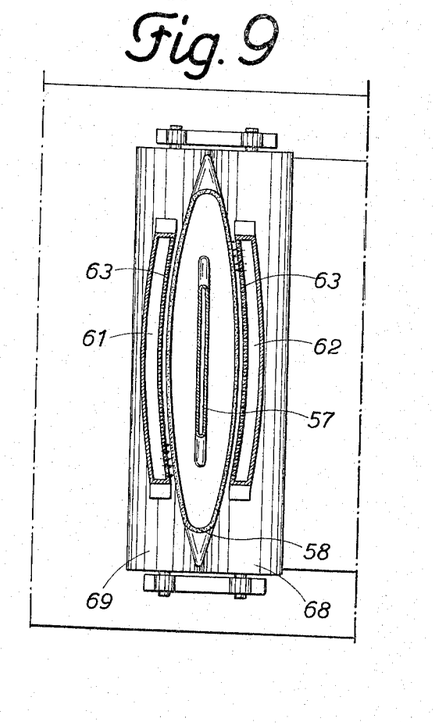
FIG. 9 shows a section taken along line IX—IX in FIG. 1.

As best seen in FIG. 7, the wire-cloth 1 is composed of three layers. The layer 13 nearest to the drive-roll and the return-roll 4 is suitably formed by an endless metal band. On the surface of this layer is attached for example by vulcanizing or cementing, a layer 14 of rubber or plastic substance. This layer is given a concave form so that the cross section of the side by side placed bands defines the circular surface of a cylinder. The layers 13 and 14 are perforated by bores 15. On the surface of the rubber or plastic layer is, in addition, fastened a wire or nylon fabric 16. The fastening is performed by fusing the wire fabric 16 in several places to the layer 14 or by binding them together in several places through the bores 15.

All of the wire-cloths 1 are so dimensioned that their edges make a tight joint. To increase the efficiency of the sealing and to keep the wire-cloths in place, adjacent faces of the wire-cloths are provided with a tongue and groove engagement.

To the outward surface of the frame 10 are, in every section of the wire-cloth, fastened several supports 17, to which rolls 18 supporting the wire-cloth are attached by bearings. The opposite side of the frame 10 is also provided with supports 19, to which elastic rolls 20 also are attached by bearings. Also fastened to the last-mentioned supports 19 are guide-plates 21, which direct the water splashing from the rolls 20, away from the wire-cloth.

Figure 1:
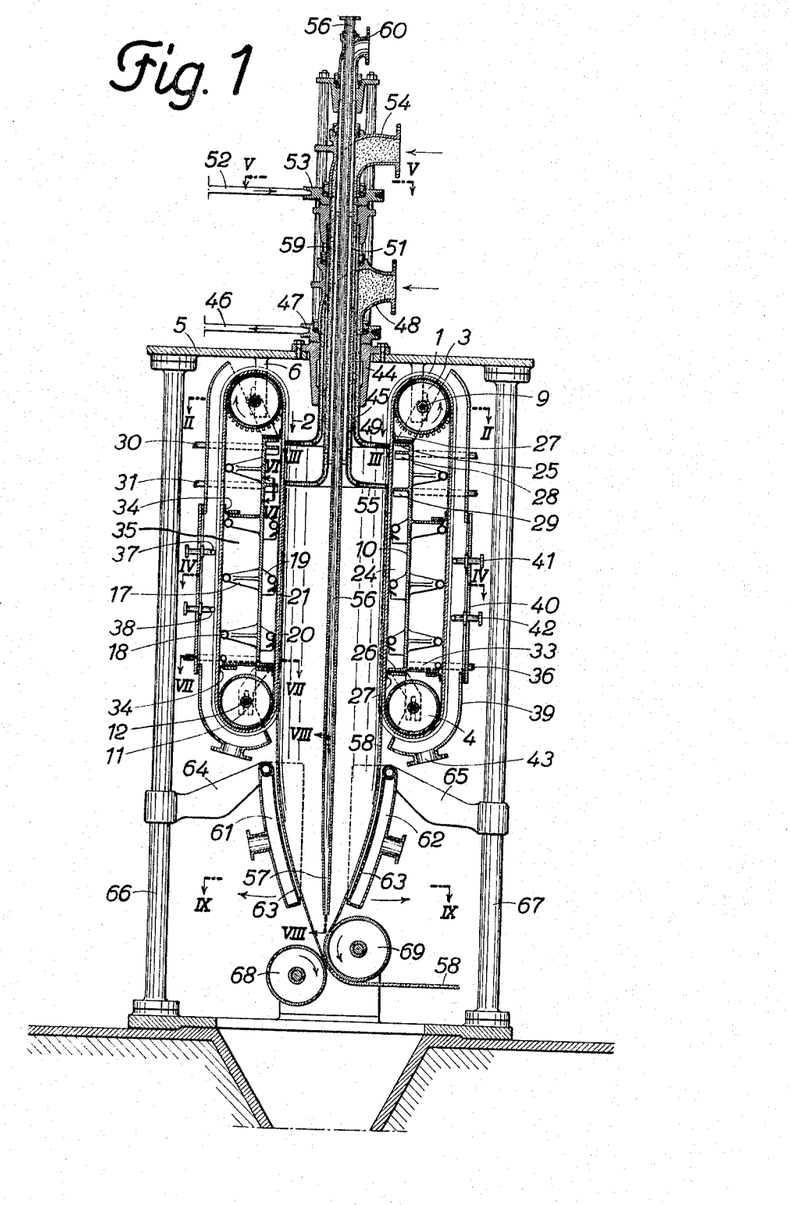
FIG. 1 is a longitudinal section of an embodiment of a machine according to the invention in a vertical position.
Figure 2:
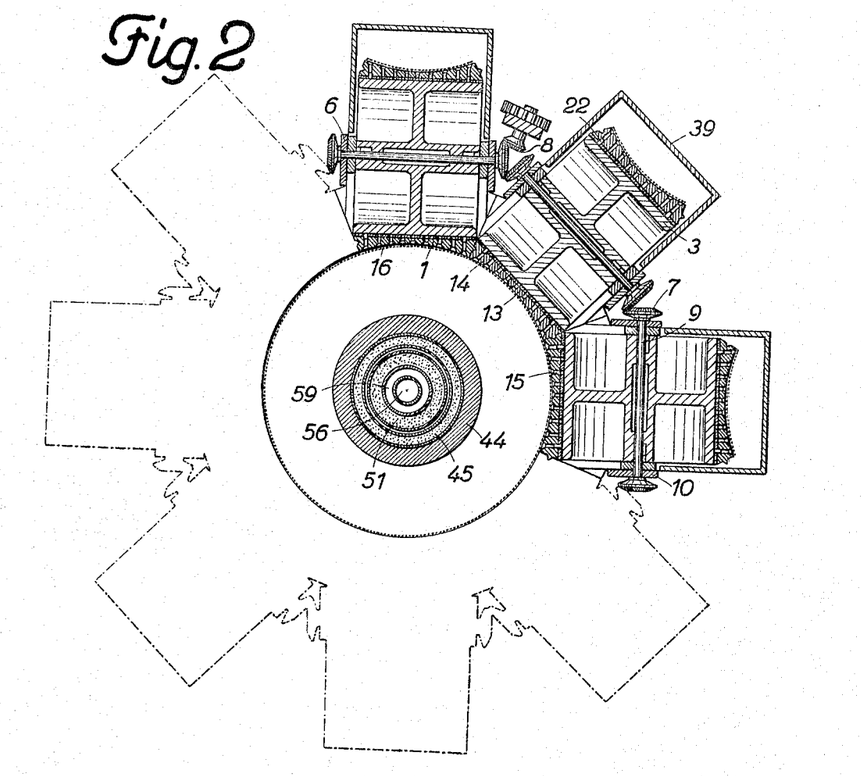
FIG. 2 is a section taken along line II—II in FIG. 1 on an enlarged scale in order to obtain a more detailed picture.
Figure 3:
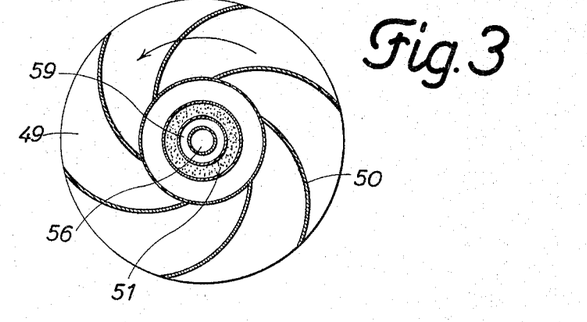
FIG. 3 is a section taken along line III—III in FIG. 1.
Figure 4:
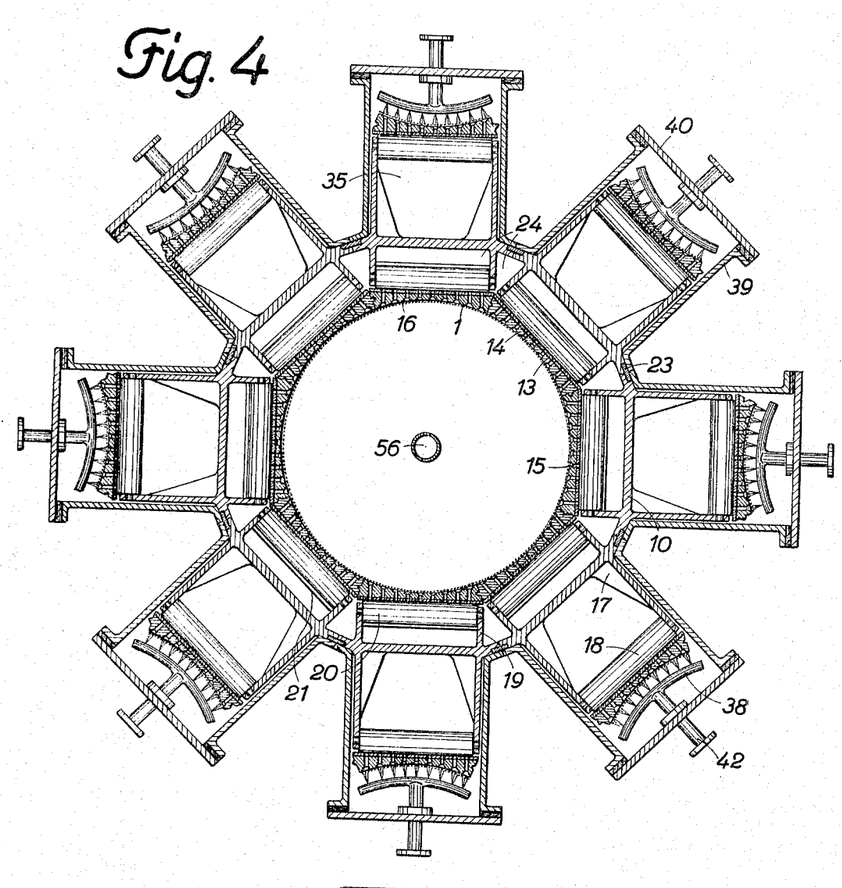
FIG. 4 shows a section taken along line IV—IV in FIG. 1.
Figure 5:
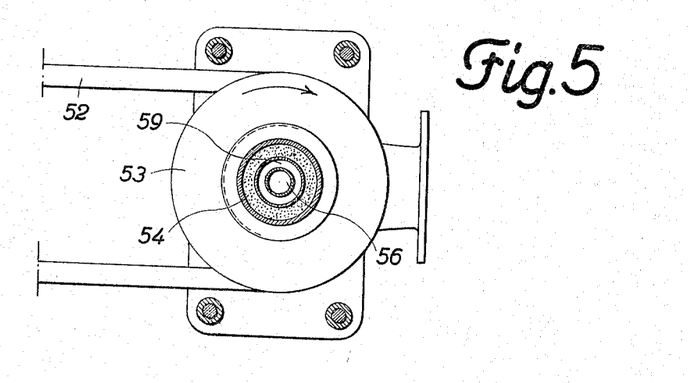
FIG. 5 shows a section taken along line V—V in FIG. 1.

Each of the drive rolls 3 of the wire cloths is provided at its periphery with pins 22, which engage in the bores 15 of the wire-cloth (see FIG. 2). Thus the wire-cloth is not allowed in any way to glide along the surface of the drive roll 3 and, consequently, all the illustrated eight wire-cloths advance with equal speeds.

Figure 6:
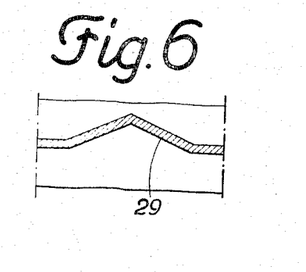
FIG. 6 shows a section taken along line VI—VI in FIG. 1.

The frame 10 of every section of the wire-cloth assembly is attached to the adjacent frames by a detachable list 23 (see FIG. 4), to which the two adjacent frames are fastened for example with screw bolts (not shown). The frames 10 thus define an annular space 24, which surrounds the cylindrical wire-cloth. At the both ends of every frame 10 are parts 25, 26 directed towards the wire-cloth to which elastic packings 27, trailing along the wire-cloth, are fastened (FIG. 1) thus closing the annular space 24 confined by the frames. In the top end of each frame 10 are formed two partitions 28 and 29 directed towards the wire-cloth, the cross section of which is seen in FIG. 6. Between two adjacent sections of the wire-cloth are arranged two pipes 30 and 31, which open proximate the partitions 28 and 29 in the annular space 24 and which are connected to a suction pump (not shown). In addition there is a pipe 33 arranged between the adjacent wire-cloth sections and opening proximate the bottom part of the frame and which also is connected to the suction pump for generating a vacuum in the annular space 24.

Every section of the wire-cloth has outside the frame a space 35 closed by elastic packings 34 from which space opens a pipe 36 for draining water out of this space. Water enters this space because the outside surface of the wire-cloth is sprinkled with washwater from two bent pipes 37 and 38, which through the holes 15 in the wire-cloth penetrates to the opposite side of the wire-cloth. Into these pipes 37 and 38, water is conducted through the cover 40 in the casing 39 by the pipes 41 and 42. The casing 39 of every wire-cloth section is detachably fastened to the frame 10 and the cover 40 is also detachably fastened to the casing 39. An opening 43 is provided in the bottom of the casing to drain away the water.

A bearing 44 is provided in the mounting plate 5 to support the annular pipe 45. This pipe is rotated by a motor (not shown) with the aid of a transmission rope 46 and a pulley 47 attached to the top of the pipe 45. The pulp suspension is conducted into the pipe through a non-rotating pipe-head 48. The bottom end of the pipe 45 is enlarged to form a disc-shaped space 49, the periphery of which is open. The pulp is ejected through the slit in the periphery, the width of which is adjustable. Curved vanes 50 are secured in this disc-shaped space 49 (see FIG. 3).

Inside the pulp pipe 45 is fitted a second ring-shaped pulp pipe 51, supported by a bearing and arranged to be rotated by means of a motor, a rope 52 and a pulley 53 in the same manner as the pipe 45, but in the opposite direction. The pulp suspension is conducted into this pipe through a non-rotating pipe head 54. The bottom end of the pulp pipe 51 is formed into a similar disc-shaped space 55 as the bottom end of the pulp pipe 45. The vanes in the disc-shaped spaces 49 and 51 are, however, curved in the opposite direction. The peripheries of the spaces 49 and 55 are situated somewhat above the partitions 28 and 29 in the frames 10 of the wire-cloth sections.

Inside the innermost pulp pipe 51 is arranged a pipe 56, which is vertically adjustable. The bottom end of this pipe is widened into a spade-shaped part 57, the shape of which corresponds with the flattening of the pulp band 58 in the corresponding point. Hot air is conducted through the pipe 56 to the bottom end of the cylindrical pulp band for the drying thereof. The moist air is exhausted through the space 59 between the pipe 56 and the pulp pipe 51, the space ending in a pipe head 60. On the other hand the pipe 56 is arranged for connection with a vacuum pump (not shown) for extracting water which may collect in the bottom end of the pulp band.

When the machine according to the invention is operated, the pulp suspension is conveyed through the pipe head 48 into the outer pulp pipe 45. This pipe rotates and by the action of the centrifugal force the pulp suspension is flung with high speed against the inside surface of the cylindrical wire-cloth. The greatest part of the water hereby penetrates the wire-cloth and the pulp forms a uniform layer on the wire-cloth. The water passing through the wire cloth falls on the partition 28 of the frame 10 and flows along the partition to the sides and is drained through the pipe 30. When the cylindrical wire-cloth moves downwards, water is continually removed through the wire-cloth, because of the vacuum prevailing in the closed space 24, confined by the frames 10. The pulp fibres are placed on the surface of the wire-cloth principally in an oblique position with regard to the actual direction of the cylinder. This is due to the pulp suspension being flung partially in an oblique direction against the surface of the wire-cloth and the cylindrical wire-cloth simultaneously advancing with high speed downwards.

The pulp conveyed through the pulp-pipe 51 forms a layer above the preceding layer in the same manner as described above. The only difference is that the main direction of the pulp fibres is oblique in a different direction to the axial direction of the cylinder as in the preceding layer. Because the fibres thus are located crosswise, the ensuing paper has approximately the same strength in all directions.

The cylindrical pulp band advances downwards and dries, owing to the suction prevailing on the opposite side of the wire-cloth and owing to the hot-air conducted through the pipe 56.

Around the bottom end of the cylindrical pulp band are fitted two curved guiding-plates 61 and 62, into which is conveyed hot air, which is discharged through holes 63 in the surfaces of the opposed surfaces of the guiding plates. By means of air-jets these guiding plates gradually flatten the cylindrical pulp band. The guiding plates 61 and 62 are fitted for swivelling movement in brackets 64 and 65, which in turn are vertically movable on the pillars 66 and 67.

Having passed the guiding plates the pulp band 58 is drawn between two pressure rollers 68 and 69. The pulp band is in this condition still so wet that the layers stick to each other. The pulp band is hereafter handled in the known manner.

Figures 10, 12:
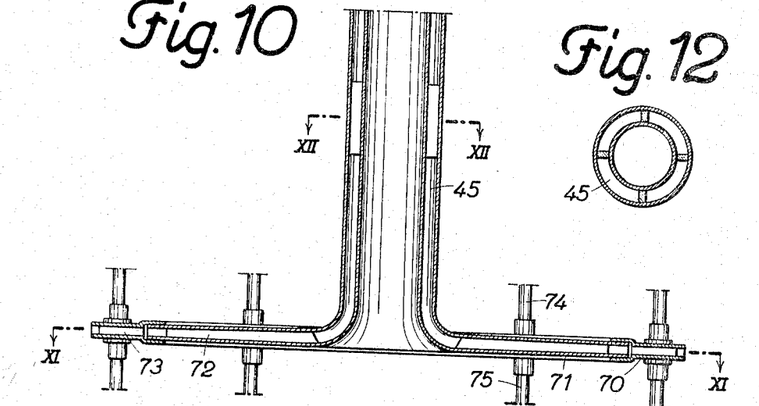
FIG. 10 shows another embodiment of the bottom end of the pulp pipe.
FIG. 12 shows a section taken along line XII—XII in FIG. 10.
Figure 11:
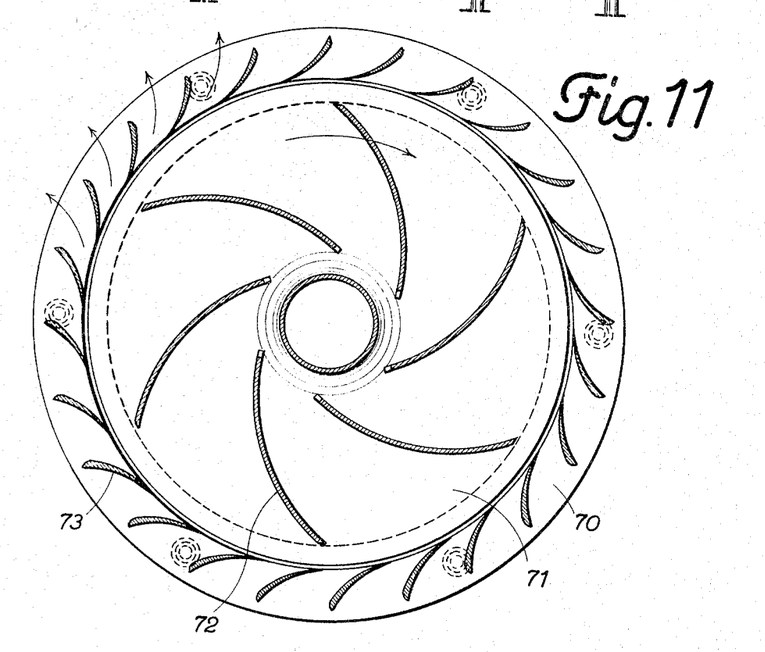
FIG. 11 shows a section taken along line XI—XI in FIG. 10.

FIGURES 10 to 12 show another embodiment of the bottom end of outermost pulp pipe 45. According to this embodiment, the disc-shaped space comprises two compartments of which the outer one is situated on the periphery of the inner compartment 71. The innermost compartment is provided with vanes 72, which convey the pulp suspension to the vanes 73 of the outer compartment, which vanes in their turn direct the pulp suspension towards the surface of the wire-cloth. The outer compartment is suspended from the support plate 5 by members 74. Members 75 are intended for the support of the outermost bottom end part of the inner pulp pipe 51. In addition to the innermost compartment 71 is rotatable and also the outer compartment 70 can be fitted to rotate. It is advantageous that the direction of the rotation and the rotation speed are arranged to be reversed, and respectively adjusted, so that a suitable outlet speed and outlet direction can be found by trial. The rotation of the outermost compartment 70 can of course be brought about easily by means of gears. The periphery height of the compartment 70 is made adjustable for the regulation of the pulp suspension flow.

Figure 13:
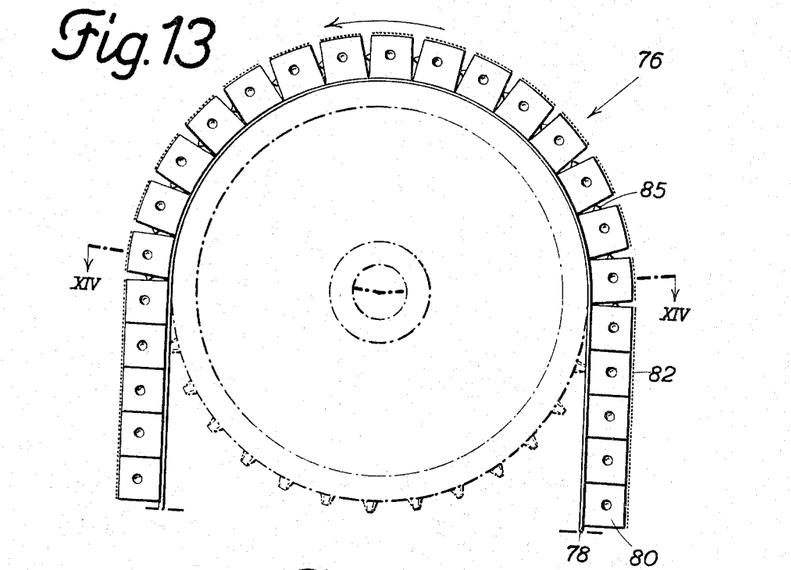
FIG. 13 shows another embodiment of a part of the wire-cloth.
Figure 14:
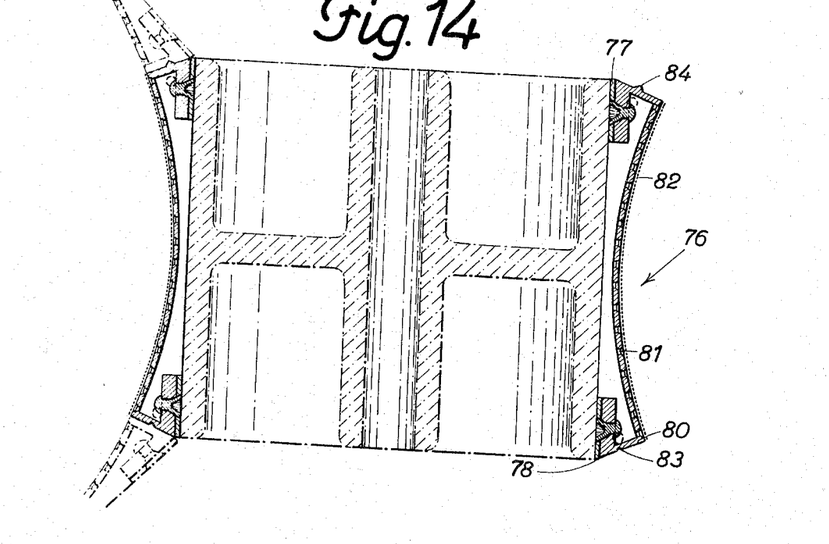
FIG. 14 shows a section taken along line XIV—XIV in FIG. 10.

FIGURES 13 and 14 show one of the eight wire-cloth sections which differs from the above specified embodiment. The wire-cloth is composed of a great number of transversal elements 76, connected with each other by two endless bands 77 and 78, made for example of metal. Each element is composed of a body 80 made of metal or plastic and open at its back side, the surface of the element being provided with holes 81. To the concave side of this element is attached a wire fabric 82. One end face of the element 76 has an identation 83 and the other a corresponding notch 84, so that the different elements belonging to the wire-cloth assembly remain exactly face to face. The side faces of the elements are also provided with notches 85—two of them to each element—and corresponding indentations in the opposite faces to keep the successive elements in their proper positions.

Figure 15:
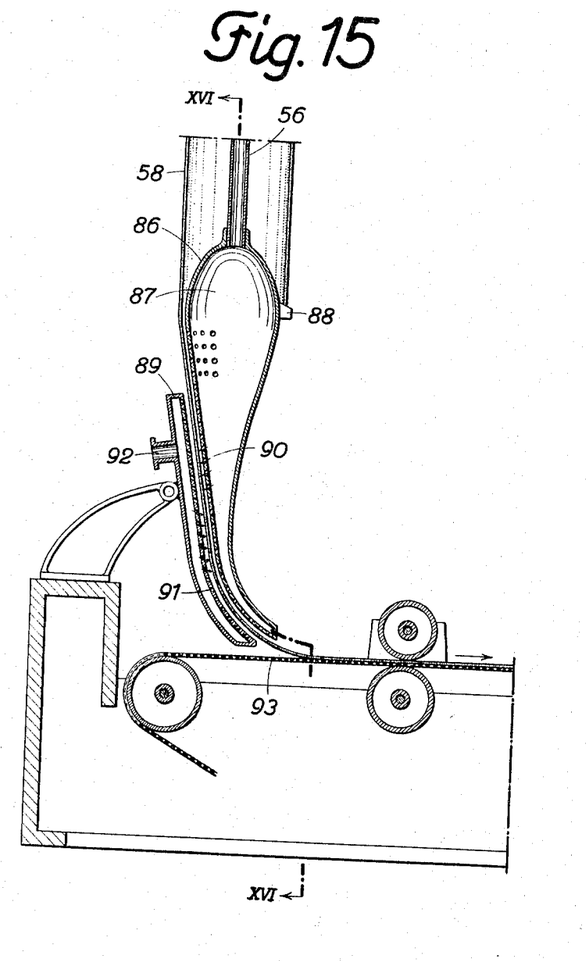
FIG. 15 shows another embodiment of the cylindrical pulp band bottom.
Figure 16:
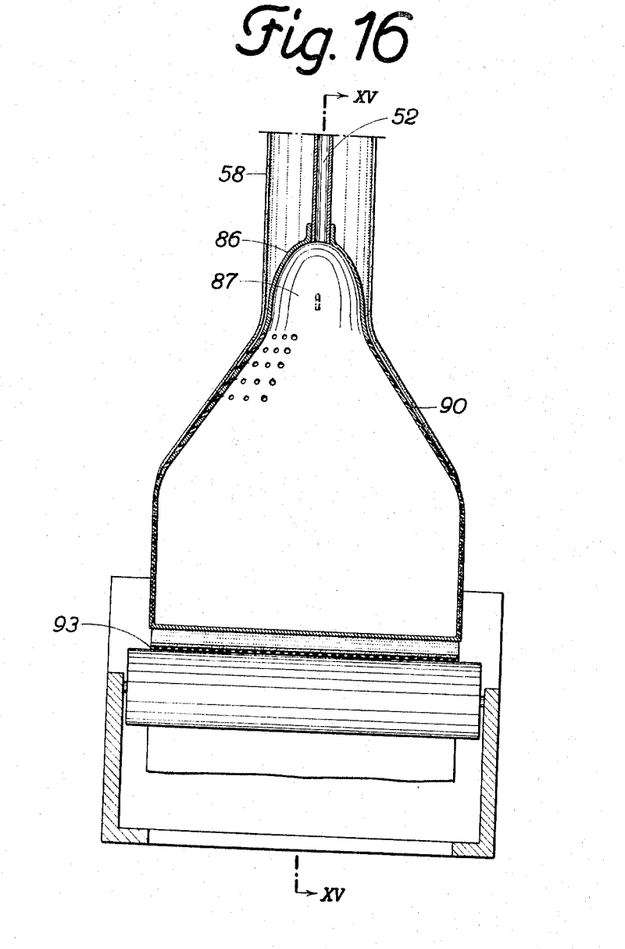
FIG. 16 shows a section taken along line XVI—XVI in FIG. 15.

In FIGURES 15 and 16 is shown another embodiment of the bottom part of the machine in accordance with the present invention. Therein a hollow guiding body 86 is attached to the bottom end of the pipe 56 and compressed air is conveyed into the hollow space 87 of the said body through the pipe 56. To the guiding body's top front face is fastened a knife-blade 88, which cuts open the cylindrical pulp band. When cut open the pulp band proceeds into the space between the guiding body 86 and a second guiding body 89. From both of the said bodies air blasts are directed towards the pulp band through the holes 90 and 91, guiding the pulp band and preventing it from touching either of the guiding bodies. Compressed air is conveyed into the guiding body 89 through the pipe 92. Thereafter, the pulp band is delivered to a felt-cloth conveyor 93 and handled in known manner. Instead of the knife-blade a sharp air jet may be used.

The foregoing specification and the accompanying drawings serve only to illustrate the invention. The different embodiments of the invention can considerably vary within the limits of the appended claims. A machine in accordance with the invention can, for example be placed in a horizontal position, even if the vertical position is more appropriate, as, obviously, floor space is saved thereby.

In the case illustrated by the drawings the pulp is conveyed through two pipes 45 and 51, but normally one pipe will suffice. With two pipes the advantage is gained that the outer layers of the paper can be made of a better quality pulp than the inner part. In addition a stratified product will be stronger than a single layer paper.

A machine provided with two layers can also be used for washing the pulp, whereby the pulp is conveyed through the pipe 45 and the washing liquid through the pipe 51. On the other hand three or even more than three pulp pipes for the wash-liquid can be provided. In addition the machine can be used for precipitating the pulp, in which case the pulp falls directly in a basin.

The pulp can also be brought into the machine under pressure. In this case it is not necessary to rotate the pulp pipes as the pressure flings the pulp against the wire-cloth. If the disc-shaped spaces 49 and 55 are then provided with strainers, the pulp pressure serves to rotate the pipes 45 and 51. By applying brakes suitably to the rotation movement of the pipes, an advantageous direction of the pulp against the wire-cloth can be effected.

Of the advantages to be gained by the invention may further be mentioned that no head box is needed for the machine. The wire-cloth does not wear and no wire-cloth direction control is needed. The pulp is spread on the wire-cloth in an absolutely uniform layer, which is not achievable with present machines. By means of the invention the pulp fibres can be directed as desired.

What is claimed is:
1. Apparatus for forming a pulp web comprising a plurality of assemblies cooperatively defining a hollow cylinder, said assemblies including respective endless wire cloths bounding said cylinder and means for advancing each said wire cloth along a path in which the cloth advances axially along the cylinder and at substantially the same rate as the other cloths, and means extending within the cylinder at one end thereof for radially discharging pulp suspension against the wire cloths to form a cylindrical web thereon which is advanced axially towards the opposite end of the cylinder.

2. Apparatus as claimed in claim 1 wherein said means for radially discharging pulp suspension comprises a pipe mounted coaxially with respect to said cylinder and including a deformed end defining a disc shape space adjacent said one end of the cylinder disposed perpendicular to the axis of the cylinder.

3. Apparatus as claimed in claim 2 wherein said pipe is supported for rotation for discharging the pulp suspension under the action of centrifugal force.

4. Apparatus as claimed in claim 2 comprising a second pipe mounted coaxially within the first pipe and having a disc shape space at a different level within the cylinder, said pipes being mounted for rotation in opposite directions.

5. Apparatus as claimed in claim 2 comprising curved vanes secured in the disc shape space of the pipe for directing the flow of the pulp suspension.

6. Apparatus as claimed in claim 2 comprising means in said disc shape dividing the same into inner and outer annular compartments at least one of which is rotatable.

7. Apparatus as claimed in claim 2 comprising a second pipe coaxially mounted within the first pipe and extending through the cylinder to supply heated drying air thereinto, and a third pipe coaxial with the aforesaid pipes for exhausting moist air.

8. Apparatus as claimed in claim 7 wherein said second pipe has an outlet at the other of the ends of the cylinder.

9. Apparatus as claimed in claim 1 comprising guide means at the other of the ends of the cylinder for gradually flattening the cylindrical web to form a flat web.

10. Apparatus as claimed in claim 9 wherein said guide means have openings for directing air pressure against the web.

11. A method for forming a web of pulp material comprising radially discharging a pulp suspension onto the interior of a cylinder having an internal surface which continuously and uniformly advances in a longitudinal direction to form a cylindrical web which longitudinally advances with said internal surface, said pulp suspension being discharged onto the interior of the cylinder in a plurality of layers which are separately formed by centrifugally discharging the pulp suspension onto the cylinder in opposite directions of rotation.

12. A method as claimed in claim 11 comprising discharging the layers of pulp suspension in alternate opposite directions.

13. A method for forming a web of pulp material comprising radially discharging a pulp suspension onto the interior of a cylinder having an internal surface which continuously and uniformly advances in a longitudinal direction to form a cylindrical web which longitudinally advances with said internal surface and passing heated drying air axially through the cylindrical web in a direction opposite to its longitudinal advancement.

14. A method for forming a web of pulp material comprising radially discharging a pulp suspension onto the interior of a cylinder having an internal surface which continuously and uniformly advances in a longitudinal direction to form a cylindrical web which longitudinally advances with said internal surface and gradually flattening the cylindrical web at the end at which it is discharged from the cylinder to form a flat web thereat.

References Cited by the Examiner

UNITED STATES PATENTS

| | | | |
|---|---|---|---|
| 768,308 | 8/1904 | Rivers | 162—384 |
| 2,489,079 | 11/1949 | Clark | 162—292 |
| 2,796,810 | 6/1957 | Muller | 162—295 |
| 2,969,836 | 1/1961 | Ceriat | 162—295 |
| 3,019,158 | 1/1962 | Newman | 162—212 |

DONALL H. SYLVESTER, *Primary Examiner.*

S. LEON BASHORE, J. H. NEWSOME,
*Assistant Examiners.*